(No Model.) 2 Sheets—Sheet 1.
A. J. HIGBEE.
CHECK ROW CORN PLANTER.
No. 426,448. Patented Apr. 29, 1890.
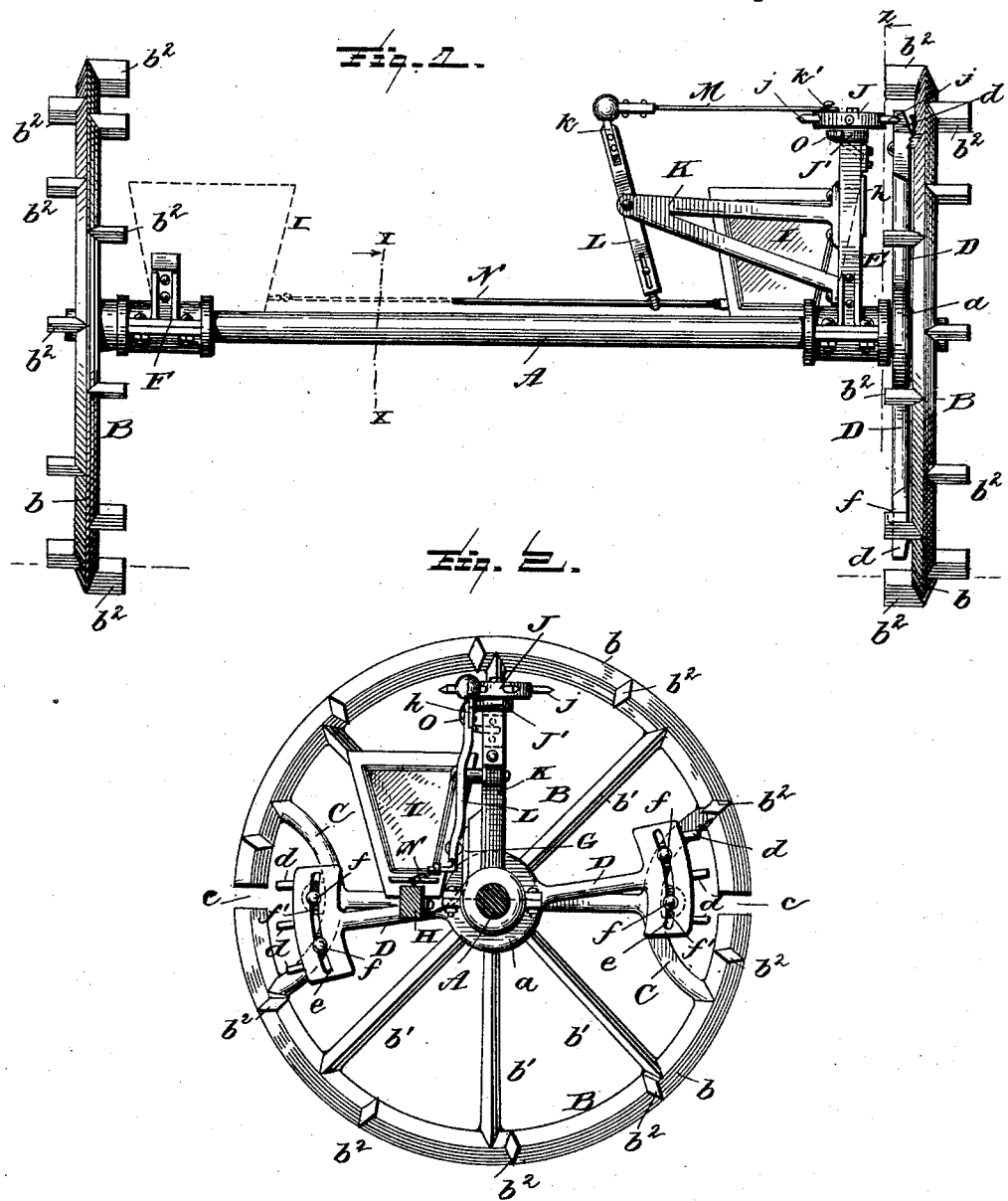
Witnesses
L. C. Hills
E. H. Bond
Inventor
Arthur J. Higbee
By his Attorneys
Chas. H. Fowler (No Model.) 2 Sheets—Sheet 2.
A. J. HIGBEE.
CHECK ROW CORN PLANTER.
No. 426,448. Patented Apr. 29, 1890.
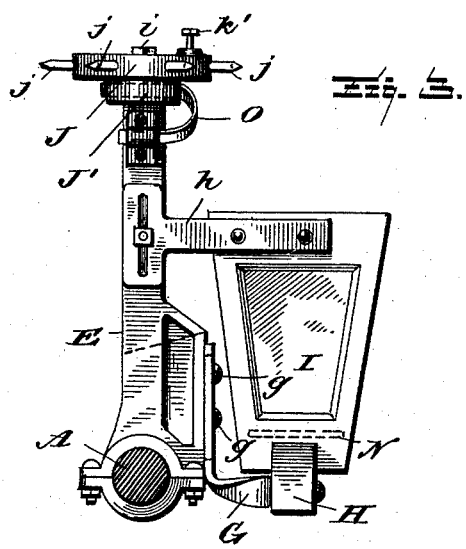
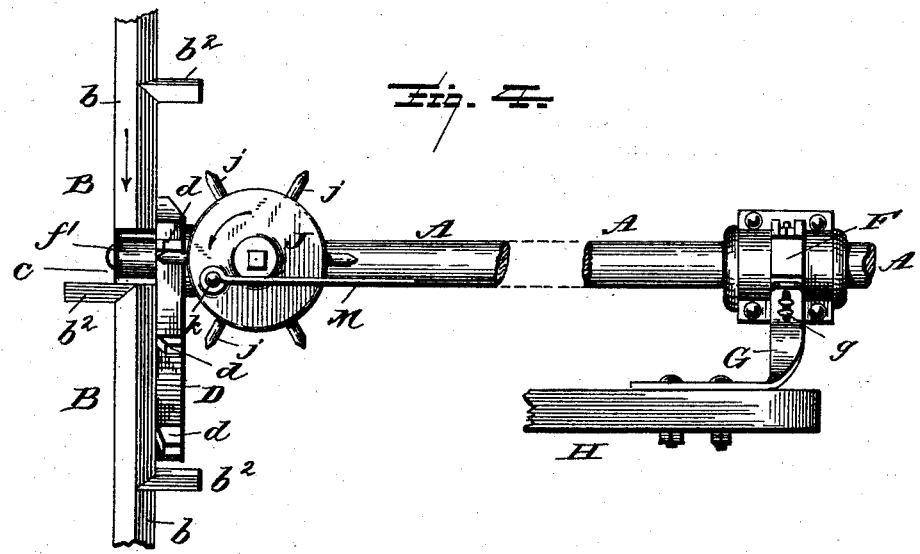
Witnesses
L. C. Hills
E. H. Bond
Inventor
Arthur J. Higbee.
By his Attorneys
Chas. H. Fowler

UNITED STATES PATENT OFFICE.

ARTHUR JAMES HIGBEE, OF KEARNEY, NEBRASKA.

CHECK-ROW CORN-PLANTER.

SPECIFICATION forming part of Letters Patent No. 426,448, dated April 29, 1890.

Application filed January 23, 1890. Serial No. 337,787. (No model.)

*To all whom it may concern:*

Be it known that I, ARTHUR JAMES HIGBEE, a citizen of the United States, residing at Kearney, in the county of Buffalo and State of Nebraska, have invented certain new and useful Improvements in Check-Row Corn-Planters; and I do hereby declare that the following is a full, clear, and exact description of the same, reference being had to the annexed drawings, making a part of this specification, and to the letters of reference marked thereon.

This invention relates to certain new and useful improvements in check-row corn-planters; and it has for its object among others to provide an improved device of this character wherein the wheels shall be better enabled to keep a level bottom and a perfect circumference. The check-row can be adjusted at the ends of the rows before starting in without the driver getting from his seat. The carriers on the wheels prevent the check-wheels from sliding in the ground and secure perfect checking. The tires of the check-wheels are provided with openings which leave a visible mark in the ground at the side of each hill of corn, and the operator is thus enabled to tell, while at any part of the row, by glancing across the rows already planted, whether it is checking correctly or not.

Other objects and advantages of the invention will hereinafter appear, and the novel features thereof will be specifically pointed out in the appended claims.

The invention is clearly illustrated in the accompanying drawings, which, with the letters of reference marked thereon, form a part of this specification, and in which—

Figure 1 is a rear view of my improved planter. Fig. 2 is a vertical section on the line $x\ x$ of Fig. 1, looking in the direction of the arrows. Fig. 3 is a vertical section on the line $z\ z$ of Fig. 1. Fig. 4 is a top plan of portions of the machine or planter.

Like letters of reference indicate like parts throughout the several views.

Referring now to the details of the drawings by letter, A designates the axle, to which the check-wheels B are attached in any well-known manner. Each of these wheels consists of a hub $a$ and a rim or tire $b$, connected by the spokes $b'$, as shown clearly in Fig. 2. The rims of the wheels are provided with lateral lugs $b^2$, which extend alternately in opposite directions. These lugs or carriers are substantially diamond-shaped in cross-section, as shown in Fig. 2, and the tire or rim of the wheel is preferably of the same shape.

The rims or tires of the wheels are provided at diametrically-opposite points with openings $c$, which serve as markers and leave a visible mark in the ground at the side of each hill of corn. In order to brace and strengthen the wheels at these openings, segmental braces or spokes C are provided, which connect the two portions of the rim upon each side of the said opening, and to this segmental brace or spoke one of the radial spokes is secured, which serves to brace and strengthen it.

On one of the wheels, or, rather, on one end of the axle and connected with the wheel, or it may be directly on the hub of the wheel, there is an arm D, which at each end is provided with cogs or teeth $d$, as shown in Fig. 2, which extend outward toward the rim or tire of the wheel, as shown in the said figure. The ends of this arm are in segmental form and are each provided with a curved slot $e$, through which pass the bolts, screws, or other means $f$, which engage lugs or ears $f'$ on the segmental braces, and by adjusting these screws or bolts in their slots the position of the cogs in relation to the openings in the tire can be regulated to cause the dropping earlier or later, as may be desired. Moving the cogs one way causes the seed to drop behind the mark and adjusting them the other way causes the seed to drop in front of the mark.

Sleeved on one end of the axle is the arm or shaft E, which is designed to support the seed-box and the dropper-actuating means. On the other end of the axle and sleeved thereon, so as to allow the axle to revolve without carrying the said arm or shafts, is the stub-shaft F. On the shafts E and F are the metallic arms or brackets G, which carry at the free ends of their lateral or horizontal portions the transverse bar H, which supports the driver's seat, (not shown,) and which is adjustable vertically by means of the screws or bolts $g$, working in slots in the said arms or brackets, as shown in Figs. 3 and 4.

I is the seed-box, supported upon one end of the planter beam or bar H and braced at its upper end by means of the arm *h* which is provided with a vertical portion slotted and engaged by a set-screw to allow of vertical adjustment.

On the upper end of the arm E, pivoted on a vertical pivot *i*, is the wheel J, provided with radial teeth *j*. Extending from this arm E is the lateral brace K, in the outer end of which is pivoted or fulcrumed the lever or arm L, which at its upper end is provided with an adjustable ball-and-socket or swivel joint *k*, which is connected by means of the pitman M with the wrist-pin *k'* on the wheel J, as shown best in Fig. 1. The lower end of this lever is connected with the dropper-slide N, as shown in Fig. 1, and which slides in suitable guides in the bottom of the seed-boxes and arranged to drop the seed alternately from opposite boxes in a manner which will be well understood. The connection at the lower end of the lever with the dropper-slide is made adjustable in any suitable manner—such, for instance, as is illustrated in Fig. 1. Adjustment is provided for all the parts where necessary. Around the hub of the wheel J is provided a collar or boss J', which is partially embraced by a flat spring O, which serves to prevent back motion of the wheel and serves to steady the parts.

The operation is simple and apparent. The check-wheels run on a stiff axle, so if one should run in a furrow the other one will carry the drop. The rotation of the wheels in the direction indicated by arrows in Fig. 4 will twice in each revolution bring the cogs *d* of the wheels in engagement with the teeth of the wheel J. This engagement causes the said wheel J to revolve, and in its revolution actuates the dropper-slide and allows the seed to drop. The parts are returned to their normal position in the further revolution of the wheels, and the dropper-slide shuts off the supply of seed until the cogs again come into engagement with the teeth of the wheel J.

The parts are simple, efficient, and durable. The adjustments provided allow of regulating the dropping as desired.

What I claim as new is—

1. A check-wheel provided with openings upon opposite sides of its rim and lateral lugs, segmental braces connecting the rim upon opposite sides of the openings, and spokes connecting the said braces opposite the openings with the hub of the wheel, substantially as described.

2. The combination, with the check-wheel having openings in its rim and segmental spoke-braces opposite the said openings, of the arm sleeved on the axle and having its ends arranged opposite the said openings and adjustably connected to the segmental spoke-braces, as set forth.

3. The combination, with the check-wheel having openings in its rim and segmental spoke-braces connecting the rim upon opposite sides of the openings, of the arm having its ends opposite the openings and carrying cogs and adjustable on the said braces, and the dropper-slide, the wheel having teeth arranged to engage the said cogs at predetermined periods and connected with the dropper-slide, as set forth.

4. The combination, with the check-wheel, the dropper-slide, and the lever pivotally connected therewith, the wheel having teeth to engage the cogs, of the arm, the pitman connecting the wheel and lever, the collar on said wheel, and the spring acting on said collar, substantially as shown and described.

5. The combination, with the axle, the check-wheel thereon and provided with openings in its rim, and the arm on the axle and having its ends opposite said openings and provided with cogs, of the segmental braces opposite said openings, the ends of the arm being slotted, and the bolts passed through the slots of the ends of the arm and engaging lugs on the segmental braces, substantially as and for the purpose specified.

In testimony that I claim the above I have hereunto subscribed my name in the presence of two witnesses.

ARTHUR JAMES HIGBEE.

Witnesses:
COSMO S. HILL,
HENRY P. FLURY.